United States Patent
Hofmann et al.

(10) Patent No.: US 7,828,484 B2
(45) Date of Patent: Nov. 9, 2010

(54) RADIAL ANTIFRICTION BEARING, PARTICULARLY A SINGLE-ROW GROOVED ANTIFRICTION BEARING OR ANGULAR CONTACT ANTIFRICTION BEARING

(75) Inventors: Heinrich Hofmann, Schweinfurt (DE); Horst Doeppling, Herzogenaurach (DE); Robert Plank, Weisendorf (DE); Arbogast Grunau, Weisendorf (DE)

(73) Assignee: Schaeffler KG, Herzogenaurach (DE)

( * ) Notice: Subject to any disclaimer, the term of this patent is extended or adjusted under 35 U.S.C. 154(b) by 385 days.

(21) Appl. No.: 11/994,176

(22) PCT Filed: Jun. 27, 2006

(86) PCT No.: PCT/DE2006/001096

§ 371 (c)(1),
(2), (4) Date: Feb. 14, 2008

(87) PCT Pub. No.: WO2007/000150

PCT Pub. Date: Jan. 4, 2007

(65) Prior Publication Data

US 2008/0267551 A1    Oct. 30, 2008

(30) Foreign Application Priority Data

Jun. 28, 2005    (DE) .................. 10 2005 029 984

(51) Int. Cl.
  *F16C 33/58*    (2006.01)
(52) U.S. Cl. .................. 384/568; 384/569; 384/516
(58) Field of Classification Search ............. 384/513, 384/516, 564, 565, 568, 569
See application file for complete search history.

(56) References Cited

U.S. PATENT DOCUMENTS

| | | | | |
|---|---|---|---|---|
| 1,301,527 A | * | 4/1919 | Weibull | 384/560 |
| 2,142,474 A | * | 1/1939 | Langhaar | 384/516 |
| 3,370,900 A | * | 2/1968 | Messerschmidt | 384/568 |
| 4,227,754 A | * | 10/1980 | Kellstrom | 384/450 |
| 4,741,632 A | * | 5/1988 | Jacobson | 384/491 |
| 4,802,775 A | * | 2/1989 | Takata | 384/450 |
| 4,929,098 A | * | 5/1990 | Takata et al. | 384/450 |
| 6,227,711 B1 | * | 5/2001 | Kellstrom et al. | 384/450 |
| 6,390,685 B1 | * | 5/2002 | Shimomura et al. | 384/568 |
| 6,817,770 B2 | * | 11/2004 | Ishiguro et al. | 384/516 |
| 7,568,550 B2 | * | 8/2009 | Yasuda et al. | 180/444 |
| 2003/0016893 A1 | * | 1/2003 | Abe et al. | 384/516 |
| 2004/0264825 A1 | * | 12/2004 | Kamamura et al. | 384/568 |

FOREIGN PATENT DOCUMENTS

| | | |
|---|---|---|
| DE | 4334195 A1 | 3/1994 |
| DE | 200 19 969 A | 3/2001 |
| DE | 100 04 584 X | 5/2001 |
| DE | 100 42 901 A | 6/2001 |
| EP | 1 035 339 A | 9/2000 |

* cited by examiner

Primary Examiner—Thomas R Hannon
(74) Attorney, Agent, or Firm—Lucas & Mercanti, LLP

(57) ABSTRACT

The radial antifriction bearing has an outer bearing ring, an inner bearing ring and roller bodies, which are arranged between the bearing rings, are held at uniform distances from one another in the peripheral direction by a bearing cage. The roller bodies are discs that each have two parallelly arranged lateral surfaces which are symmetrically flattened from a spherical basic shape. In order to prevent edge stresses between the discs and the raceways, at least the raceway in the inner bearing ring, on its outer edge areas, transition into a logarithmically decreasing profile.

4 Claims, 2 Drawing Sheets

RADIAL ANTIFRICTION BEARING, PARTICULARLY A SINGLE-ROW GROOVED ANTIFRICTION BEARING OR ANGULAR CONTACT ANTIFRICTION BEARING

FIELD OF THE INVENTION

The invention relates to a radial antifriction bearing according to the features of patent claim 1 which form the preamble, and it can be realized particularly advantageously on single-row grooved antifriction bearings or angular contact antifriction bearings.

BACKGROUND OF THE INVENTION

It is generally known to a person skilled in the art of antifriction bearing technology that single-row grooved ball bearings represent a classic form of rigid radial antifriction bearings which cannot be dismantled, have deep grooves configured with a radius a little larger than the ball radius and are distinguished above all by the fact that their radial and axial loadbearing capability is equally high and that they have the highest speed limits of all bearing types on account of their low friction. In contrast, single-row angular contact ball bearings are a further form of radial antifriction bearings which can or cannot be dismantled, since their raceways are arranged in such a way that the forces which occur are transmitted from one raceway to the other at a defined contact angle obliquely with respect to the radial plane. However, on account of their contact angle, angular contact ball bearings are better suited to absorbing higher axial forces than grooved ball bearings, it being possible for radial forces to be transmitted by single-row angular contact ball bearings only if they are loaded axially at the same time. These single-row grooved ball bearings and angular contact ball bearings have been known for a long time and comprise substantially an outer bearing ring and inner bearing ring and a multiplicity of balls as rolling bodies which are arranged between the bearing rings. Ball raceways which are delimited by one or two shoulders, each of which are machined into the inner side of the outer bearing ring and into the outer side of the inner bearing ring, in which ball raceways the balls roll by way of their running faces and are guided at uniform spacings from one another by a bearing cage.

In grooved ball bearings or angular contact ball bearings of this type, the necessarily different configuration of the raceway radii in comparison with the ball radii has proven disadvantageous, however, to the extent that the bearing balls are only in punctiform contact with their raceway in the inner bearing ring as a result and therefore cause a high surface pressure on the raceway in the region of the contact angle axis, which high surface pressure is responsible for increased wear of said raceway. In addition, high edge stresses occur in the region of the shoulder edge/edges of the raceway as a result of the bearing balls which overlap said shoulder edge/edges in the case of normal osculation but bear against the shoulder edge/edges after the osculation has been used up, as a result of which high edge stresses the wear of the raceway for the bearing balls is increased still further and the service life of grooved ball bearings or angular contact ball bearings of this type is reduced considerably.

One possibility of avoiding the high surface pressure on the raceway of the inner bearing ring in the region of the contact angle axis of the rolling bodies has been disclosed in DE 43 34 195 A1. In the radial antifriction bearings which are disclosed in said document and are configured per se as single-row grooved ball bearing or angular contact ball bearing, however, the rolling bodies are not formed by balls but rather either partially or completely by what are known as spherical disks which are configured with two side faces which are flattened symmetrically from a basic spherical shape and are arranged parallel to one another. The width of these spherical disks between their side faces is configured to be smaller than the spacing between the inner side of the outer bearing ring and the outer side of the inner bearing ring, with the result that, when the bearing is filled, the spherical disks can be inserted into the bearing axially with respect to the bearing through the spacing between the inner ring and the outer ring and can be rotated into the raceway. Since the spherical disks have a constant rotational axis in contrast to conventional bearing balls, the running faces of the spherical disks are configured with the same radius as their raceways in the bearing rings, with the result that the spherical disks are in linear contact with the raceways. As a result of this linear contact, instead of the disadvantageous punctiform contact which occurs in single-row grooved ball bearings or angular contact ball bearings, a situation is achieved where a uniform surface pressure with a low stress level occurs between the spherical disks and the raceways.

However, it has been shown in operation and under load that, in grooved antifriction bearings or angular contact antifriction bearings of this type with spherical disks as rolling bodies, as a result of the fact that the raceways in the bearing rings are of wider configuration than the spherical disks, the spherical disks cause high edge stresses at the outer edge regions of the raceway in the inner bearing ring by way of their edge parts which adjoin their straight side faces, which high edge stresses are still responsible for increased wear of this raceway and therefore reduce the service life of grooved antifriction bearings or angular contact antifriction bearings of this type.

OBJECT OF THE INVENTION

Proceeding from the cited disadvantages of the solutions of the known prior art, the invention is therefore based on the object of designing a radial antifriction bearing, particularly a single-row grooved antifriction bearing or angular contact antifriction bearing with spherical disks as rolling bodies, with which both high surface pressure on the raceway which occurs in the region of the contact angle axis and a high edge stress which occurs at the outer edge regions of the raceway in the inner bearing ring are avoided effectively and the service life of the grooved antifriction bearing or angular contact antifriction bearing is therefore increased.

DESCRIPTION OF THE INVENTION

According to the invention, this object is achieved in a radial antifriction bearing in such a way that at least the raceway in the inner bearing ring, in each case at its outer edge regions, and/or the running faces of the spherical disks, in each case at their edge parts which adjoin the side faces, merges/merge into a logarithmically falling profile.

The invention is therefore based on the realization that, as a result of a logarithmically falling profile in the regions of the edge stresses which have occurred up to then, it is possible to effectively avoid edge stresses of this type and at the same time to retain the linear contact of the spherical disks with their raceways which is advantageous for a uniformly low surface stress. At the same time it can be advantageous to optionally arrange the logarithmic profile either at the outer edge regions of the raceway in the inner bearing ring or at those edge parts of the running faces of the spherical disks which adjoin the side faces or both at the edge regions of the raceway and at the running faces of the spherical disks.

Preferred embodiments and advantageous developments of the single-row radial antifriction bearing which is configured according to the invention are described in the subclaims.

Accordingly, there is provision that in the radial antifriction bearing, which is configured according to the invention, for the surface area portion of those outer edge regions of the raceway of the inner bearing ring which are configured with a logarithmically falling profile and/or of the edge parts of the running faces of the spherical disks to be each from approximately 10% to 40% of the surface area of the raceway of the inner bearing ring or of the running face of a spherical disk. As a result, the portion which is configured with the same radius of the running faces of the spherical disks and of the raceway face of the inner bearing ring is between 60% and 90%, as a result of which 100% osculation and linear contact is ensured between the spherical disks and the raceways.

Finally, as a further embodiment of the radial antifriction bearing, which is configured according to the invention, it is also proposed that the radius of the logarithmic profile at the outer edge regions of the raceway of the inner bearing ring is preferably greater than the radius of the running faces of the spherical disks, and that the radius of the logarithmic profile at the edge parts of the running faces of the spherical disks is preferably smaller than the radius of the running faces of the spherical disks. The center points of all the radii are arranged above one another, preferably on the contact angle axis of the radial antifriction bearing, with the result that uniform large wedge-shaped annular gaps are produced on both sides between the edge parts of the running faces of the spherical disks and the edge regions of the raceway of the inner bearing ring. However, it is also possible to arrange the center points of the radii for the logarithmic profile at the spherical disks and/or at their raceway in the inner bearing ring on both sides next to the contact angle axis of the radial nonfriction bearing, with the particular advantage that the radii merge tangentially into one another as a result.

In comparison with the radial antifriction bearings which are known from the prior art, the radial antifriction bearing which is configured according to the invention therefore has the advantage that, as a result of the arrangement of logarithmically falling profiles in the regions of the edge stresses which have occurred up to then, it has neither a high surface pressure on the raceway which occurs in the region of the contact angle axis nor a high edge stress which occurs at the outer edge regions of the raceway in the inner bearing ring, and is therefore distinguished by a high service life.

BRIEF DESCRIPTION OF THE DRAWINGS

One preferred embodiment of the radial antifriction bearing which is configured according to the invention will be explained in greater detail in the following text with reference to the appended drawings, in which.

DETAILED DESCRIPTION OF THE DRAWINGS

Figure 2:
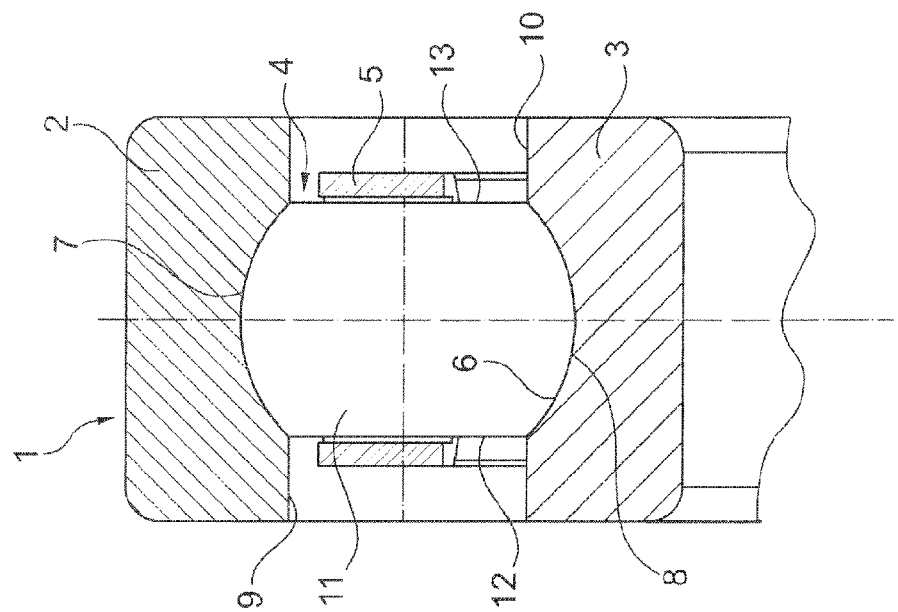
FIG. 2 shows an enlarged illustration of the detail X of the radial antifriction bearing which is configured according to the invention in accordance with FIG. 1.
Figure 1:
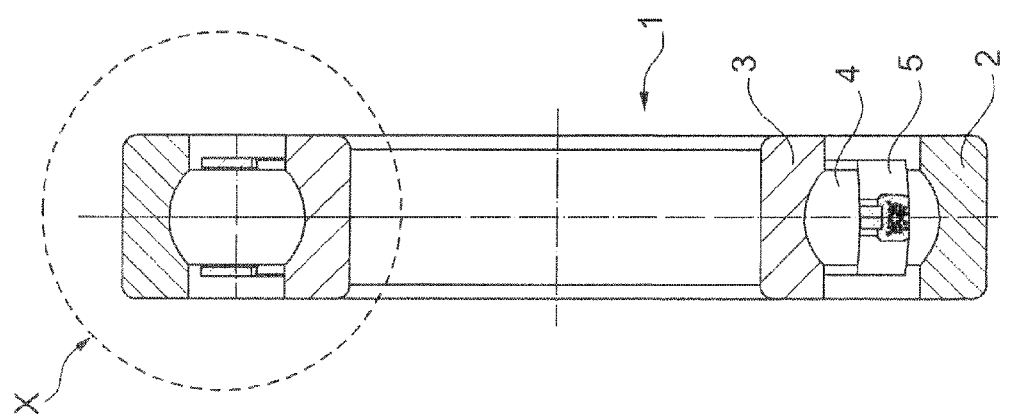
FIG. 1 shows a cross section through a radial antifriction bearing which is configured according to the invention in the form of a grooved antifriction bearing.

A radial antifriction bearing 1 which is configured as a grooved antifriction bearing is clearly apparent from FIG. 1, which, in a similar manner to known grooved ball bearings, comprises substantially an outer bearing ring 2 and an inner bearing ring 3 and a multiplicity of rolling bodies 4 which are arranged between the bearing rings 2, 3 and are kept at uniform spacings from one another in the circumferential direction by a bearing cage 5. The detail X according to FIG. 1 which is shown enlarged in FIG. 2 shows that the rolling bodies 4 are configured as spherical disks 11 having two side faces 12, 13 each which are flattened symmetrically from a basic spherical shape and are arranged parallel to one another and roll by way of their running faces 6 in two raceways 7, 8 which are delimited in each case by two shoulders and are machined into the inner side 9 of the outer bearing ring 2 and into the outer side 10 of the inner bearing ring 3.

Figure 3:
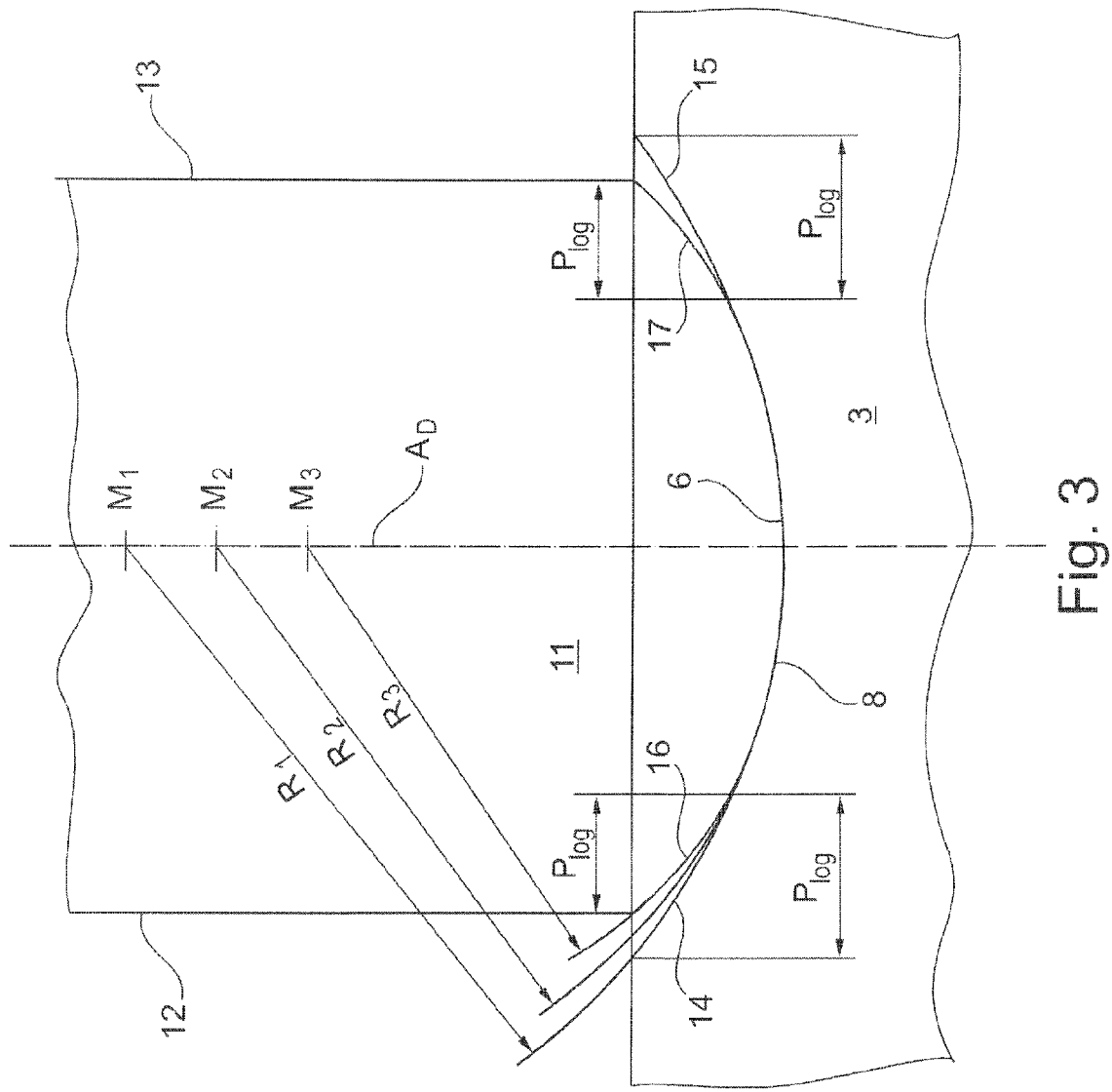
FIG. 3 shows an enlarged illustration of the contact region between the rolling bodies and the raceway of the inner bearing ring of the radial antifriction bearing which is configured according to the invention.

Furthermore, it becomes clear from FIG. 3 that, in order to avoid a high edge stress which occurs at the outer edge regions 14, 15 of the raceway 8 in the inner bearing ring 3, both the raceway 8 in the inner bearing ring 3, at its outer edge regions 14, 15, and the running faces 6 of the spherical disks 11, at their edge parts 16, 17 which adjoin the side faces 12, 13, merge into a logarithmically falling profile $P_{log}$. The surface area portion of those outer edge regions 14, 15 of the raceway 8 of the inner bearing ring 3 which are configured with a logarithmically falling profile $P_{log}$ and of the edge parts 16, 17 of the running faces 6 of the spherical disks 11 is, as is apparent from FIG. 3 at least in outlines, in each case approximately 30% of the surface area of the raceway 8 of the inner bearing ring 3 or of the running face 6 of a spherical disk 11, with the result that the portion, which is configured with the same radius, of the running faces 6 of the spherical disks 11 and of the surface area of the raceway 8 in the inner bearing ring 3 is approximately 70%.

It can likewise be seen from FIG. 3 that the radius $R_1$ of the logarithmic profile $P_{log}$ at the outer edge regions 14, 15 of the raceway 8 of the inner bearing ring 3 is greater than the radius $R_2$ of the running faces 6 of the spherical disks 11, and that the radius $R_3$ of the logarithmic profile $P_{log}$ at the edge parts 16, 17 of the running faces 6 of the spherical disks 11 is smaller than the radius $R_2$ of the running faces 6 of the spherical disks 11. The center points $M_1$, $M_2$, $M_3$ of all the radii $R_1$, $R_2$, $R_3$ are arranged above one another in a clearly visible manner on the contact angle axis $A_D$ of the radial antifriction bearing 1, with the result that uniform large wedge-shaped annular gaps are produced on both sides between the edge parts 16, 17 of the running faces 6 of the spherical disks 11 and the edge regions 14, 15 of the raceway 8 of the inner bearing ring 3.

LIST OF DESIGNATIONS

1 Radial antifriction bearing
2 Outer bearing ring
3 Inner bearing ring
4 Rolling body
5 Bearing cage
6 Running face of 4
7 Raceway in 2
8 Raceway in 3
9 Inner side of 2
10 Outer side of 3
11 Spherical disks
12 Side face of 11
13 Side face of 11
14 Edge region of 8

15 Edge region of 8
16 Edge part of 6
17 Edge part of 6

The invention claimed is:

1. A radial antifriction bearing, comprising:
an outer bearing ring;
an inner bearing ring; and
a multiplicity of rolling bodies which are arranged between the outer bearing ring and the inner bearing ring and are kept at uniform spacings from one another in a circumferential direction by a bearing cage and roll by way of running faces in a first raceway and a second raceway which are each delimited by one or two shoulders, the first raceway being machined into an inner side of the outer bearing ring and the second raceway being machined into an outer side of the inner bearing ring, the rolling bodies being configured as spherical disks each having two side faces which are flattened symmetrically from a basic spherical shape and are arranged parallel to one another,
wherein the second raceway in the inner bearing ring, in each case, at outer edge regions, and the running faces of the spherical disks, in each case, at edge parts, which adjoin the side faces of the spherical disks, merge into a logarithmically falling profile.

2. The radial antifriction bearing of claim 1, wherein a surface area portion of the outer edge regions of the second raceway of the inner bearing ring and the edge parts of the running faces of the spherical disks is each from approximately 10% to 40% of the surface area of the second raceway of the inner bearing ring or of the running face of a spherical disk.

3. The radial antifriction bearing of claim 2, wherein a radius of the logarithmic profile at the outer edge regions of the second raceway of the inner bearing ring is greater than a radius of the running faces of the spherical disks, center points of the radius of the logarithmic profile at the outer edge regions of the second raceway of the inner bearing ring and the radius of the running faces of the spherical disks being arranged above one another.

4. The radial antifriction bearing of claim 2, wherein a radius of the logarithmic profile at the edge parts of the running faces of the spherical disks is smaller than a radius of the running faces of the spherical disks, the center points of the radius of the logarithmic profile at the edge parts of the running faces of the spherical disks and the radius of the running faces of the spherical disks being arranged below one another.

* * * * *